United States Patent
Tsuneno et al.

(10) Patent No.: US 10,592,731 B2
(45) Date of Patent: Mar. 17, 2020

(54) FACIAL RECOGNITION SYSTEM, FACIAL RECOGNITION SERVER, AND FACIAL RECOGNITION METHOD

(71) Applicant: Panasonic Intellectual Property Management Co., Ltd., Osaka (JP)

(72) Inventors: Masashige Tsuneno, Fukuoka (JP); Kaoru Tsurumi, Fukuoka (JP); Norio Saitou, Kanagawa (JP)

(73) Assignee: PANASONIC I-PRO SENSING SOLUTIONS CO., LTD., Fukuoka (JP)

( * ) Notice: Subject to any disclaimer, the term of this patent is extended or adjusted under 35 U.S.C. 154(b) by 0 days.

(21) Appl. No.: 15/578,920

(22) PCT Filed: May 27, 2016

(86) PCT No.: PCT/JP2016/002567
§ 371 (c)(1),
(2) Date: Dec. 1, 2017

(87) PCT Pub. No.: WO2016/203717
PCT Pub. Date: Dec. 22, 2016

(65) Prior Publication Data
US 2018/0157898 A1   Jun. 7, 2018

(30) Foreign Application Priority Data
Jun. 15, 2015 (JP) .................. 2015-120455

(51) Int. Cl.
*G06K 9/00* (2006.01)
*H04N 7/18* (2006.01)

(52) U.S. Cl.
CPC ..... *G06K 9/00288* (2013.01); *G06K 9/00281* (2013.01); *G06K 9/00778* (2013.01); *H04N 7/18* (2013.01)

(58) Field of Classification Search
CPC combination set(s) only.
See application file for complete search history.

(56) References Cited

U.S. PATENT DOCUMENTS

2003/0169908 A1* 9/2003 Kim .................. G06K 9/00281
382/118
2013/0070974 A1* 3/2013 Stefani ............... G06K 9/00295
382/118

(Continued)

FOREIGN PATENT DOCUMENTS

JP   2014-232495   12/2014
JP   2016-122918   7/2016

OTHER PUBLICATIONS

International Search Report dated Aug. 9, 2016 in International (PCT) Application No. PCT/JP2016/002567.

*Primary Examiner* — Zhiyu Lu
(74) *Attorney, Agent, or Firm* — Wenderoth, Lind & Ponack, L.L.P.

(57) ABSTRACT

A statistical processing is performed without performing complicated determination, so as not to repetitively include the same person. A facial feature extractor (32) in a facial recognition server (30) extracts features of facial image data including a face which is shown in an image obtained by a camera device (10) imaging an imaging area. A preservation unit (35) preserves features of facial image data including a face which has passed through the imaging area, in a pre-passing comparative original facial feature data memory (41). A statistics unit (37) performs statistical processing on the features of the facial image data, which are extracted by the facial feature extractor (32), in a case where feature having high similarity which is obtained by comparison with the features (extracted by the facial feature extractor (32)) of the facial image data imaged by the camera device (10) and is equal to or greater than a predetermined value are not (Continued)

preserved in the pre-passing comparative original facial feature data memory (41) until a predetermined time from an imaging time point by the camera device (10).

7 Claims, 4 Drawing Sheets

(56) References Cited

U.S. PATENT DOCUMENTS

| | | |
|---|---|---|
| 2014/0358639 A1 | 12/2014 | Takemoto et al. |
| 2016/0191862 A1 | 6/2016 | Yokomitsu et al. |
| 2017/0195635 A1 | 7/2017 | Yokomitsu et al. |

* cited by examiner

FIG. 3

| SEARCHING CONDITION | SEARCHING RESULT |
|---|---|
| YEAR/MONTH/DAY ☐<br>PERIOD ☑<br>LOCATION ☐<br>AGE ☑<br>GENDER ☑<br>CAMERA ID ☐<br>⋮ ⋮ | 2015 4/2 16:15 ⎫<br>30 YEARS OLD ⎬ TK1   [G1]<br>WOMEN ⎭<br>─────────────────<br>2015 4/2 13:30 ⎫<br>28 YEARS OLD ⎬ TK2   [G2]<br>WOMEN ⎭<br>─────────────────<br>2015 4/2 12:30 ⎫<br>33 YEARS OLD ⎬ TK3   [G3]<br>WOMEN ⎭<br>⋮ ⋮ |

FACIAL RECOGNITION SYSTEM, FACIAL RECOGNITION SERVER, AND FACIAL RECOGNITION METHOD

TECHNICAL FIELD

The disclosure relates to a facial recognition system, a facial recognition server, and a facial recognition method of recognizing a face of a person by using a video image which is imaged by a camera device.

BACKGROUND ART

In the related art, a customer analysis system as follows is known (for example, see PTL 1). When the customer base of a person shown in an imaging area set in a store is determined, the customer analysis system determines whether or not the person is a customer as an analysis target, based on an action pattern of the person, and excludes the person who is determined not to be the analysis target, from the analysis target. Thus, the customer analysis system analyzes the customer base of a customer who comes to a store, with high accuracy.

In the customer analysis system, for example, the imaging area is set such that a customer who is directed toward a seat from a guide waiting area in the vicinity of a doorway in a store is imaged from the front. A person who performs an action which is different from an action of moving toward the seat is detected, and the detected person is excluded from the analysis target. Thus, a person such as a clerk, which is not a customer is included as the analysis target, and an occurrence of a situation in which the same customer is repetitively included as the analysis target is avoided.

CITATION LIST

Patent Literature

PTL 1: Japanese Patent Unexamined Publication No. 2014-232495

SUMMARY OF THE INVENTION

However, in the configuration in PTL 1, in a case where a person does not take a predetermined action pattern, it is possible to exclude this person from the analysis target. However, complicated determination processing is required for determining whether or not a person does a predetermined action pattern.

Even in a case where it can be determined that a person does a predetermined action pattern, if the same person goes to the doorway of a store and back twice or more because of a certain business, it is considered that the person is repetitively counted. In the configuration in PTL 1, it is considered that, in a case where a person does not do a predetermined action pattern, the person is excluded from the analysis target even though the person is a customer as the analysis target.

The disclosure has been made considering the above-described circumstances in the related art. An object of the disclosure is to provide a facial recognition system, a facial recognition server, and a facial recognition method in which it is possible to efficiently perform statistical processing without performing complicated determination, so as not to repetitively include the same person.

According to the disclosure, there is provided a facial recognition system in which a camera device and a facial recognition server are connected to each other. The facial recognition server includes a feature extractor, a preservation unit, and a statistical processing unit. The feature extractor extracts features of facial image data including the face of a person shown in video image data, based on the video image data obtained by the camera device imaging an imaging area. The preservation unit preserves the features of the facial image data, which are extracted by the feature extractor, in a facial feature memory. The statistical processing unit performs statistical processing by using the features of the facial image data, which are extracted by the feature extractor, in a case where the features of facial image data, which has similarity which is obtained by comparison with the features of the facial image data, which are extracted by the feature extractor and is equal to or greater than a predetermined value are preserved in the facial feature memory over a predetermined time from an imaging time point of the camera device.

According to the disclosure, there is provided a facial recognition server connected to a camera device. The facial recognition server includes a feature extractor, a preservation unit, and a statistical processing unit. The feature extractor extracts features of facial image data including the face of a person shown in video image data, based on the video image data obtained by the camera device imaging an imaging area. The preservation unit preserves the features of the facial image data, which are extracted by the feature extractor, in a facial feature memory. The statistical processing unit performs statistical processing by using the features of the facial image data, which are extracted by the feature extractor, in a case where the features of facial image data, which has similarity which is obtained by comparison with the features of the facial image data, which are extracted by the feature extractor and is equal to or greater than a predetermined value are preserved in the facial feature memory over a predetermined time from an imaging time point of the camera device.

According to the disclosure, there is provided a facial recognition method in a facial recognition system in which a camera device and a facial recognition server are connected to each other. The facial recognition method includes processing of extracting features of facial image data including the face of a person shown in video image data, based on the video image data obtained by the camera device imaging an imaging area, processing of preserving the extracted features of the facial image data in a facial feature memory, and processing of performing statistical processing by using the extracted features of the facial image data, in a case where the features of facial image data, which has similarity which is obtained by comparison with the extracted features of the facial image data and is equal to or greater than a predetermined value are preserved in the facial feature memory over a predetermined time from an imaging time point of the camera device.

According to the disclosure, it is possible to perform statistical processing without performing complicated determination, so as not to repetitively include the same person.

BRIEF DESCRIPTION OF DRAWINGS

FIG. 3 is a diagram illustrating an example of a UI screen displayed in a display of a user terminal.

DESCRIPTION OF EMBODIMENT

Hereinafter, an exemplary embodiment (referred to as "this exemplary embodiment" below) in which a facial recognition system, a facial recognition server, and a facial recognition method in the disclosure are specifically disclosed will be described in detail with reference to the drawings. Detailed descriptions which are unnecessary may be omitted. For example, detailed descriptions of an item which are already known or the repetitive descriptions for the substantially same component may be omitted. This is because it is avoided that the following descriptions become unnecessarily redundant, and the person in the related art is caused to easily understand the following descriptions. The accompanying drawings and the following descriptions are provided in order to cause the person in the related art to sufficiently understand the disclosure and it is not intended that the topics described in claims are not limited thereto.

Figure 1:
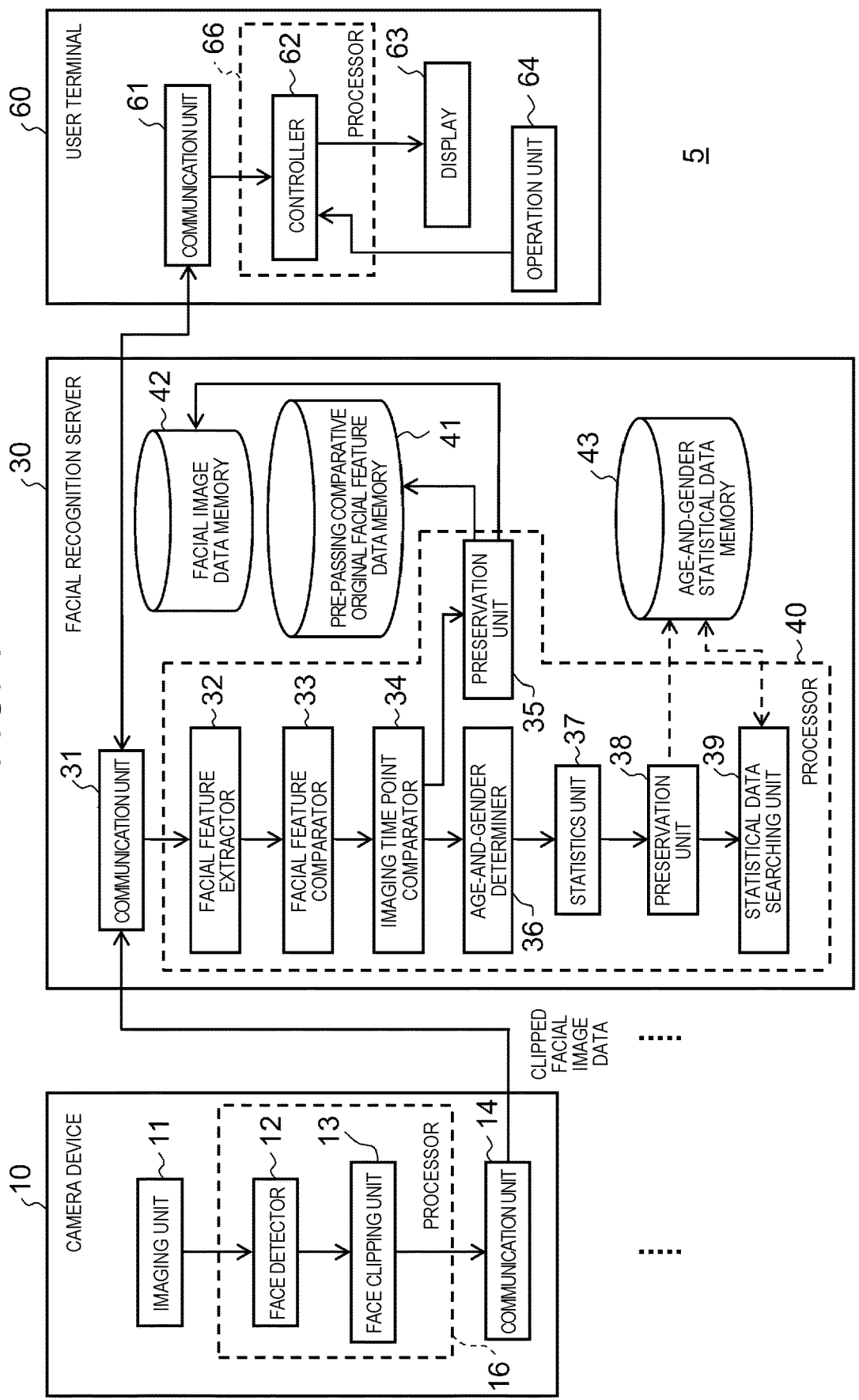
FIG. 1 is a block diagram specifically illustrating an example of an internal configuration of a facial recognition system according to an exemplary embodiment.

FIG. 1 is a block diagram specifically illustrating an example of an internal configuration of facial recognition system 5 in this exemplary embodiment. Facial recognition system 5 illustrated in FIG. 1 has a configuration in which plurality of camera devices 10, facial recognition server 30, and user terminal 60 are connected to each other.

Each of camera devices 10 performs imaging of a predetermined location in a store or the like, which is preset, as an imaging area. Each of camera devices 10 acquires facial image data including the face of a person who passes through the imaging area. The face of the person is shown in the imaged video image. Each of camera devices 10 includes imaging unit 11, face detector 12, face clipping unit 13, and communication unit 14. The number of camera devices 10 in this exemplary embodiment may be one or plural.

The imaging unit includes an image pickup device such as a charge coupled device (CCD) image sensor or a complementary metal-oxide semiconductor (CMOS) image sensor. The imaging unit performs imaging of light which is incident from the preset imaging area, on a light receiving surface, and converts the optical image into an electrical signal. Thus, a frame of video image data indicating a video image of the imaging area is obtained.

Face detector 12 detects a face included in the video image imaged by imaging unit 11. Face detection processing is processing of detecting a face by using a well-known technology, for example, as follows: a method of detecting a part of the face, such as the eyes, the nose, and the mouse; a method of detecting a skin color; a method of detecting the hair; and a method of detecting a part such as the neck and the shoulders. As the method of the face detection processing, a pattern recognition technology based on statistical learning may be used.

Face clipping unit 13 clips facial image data including the face which has been detected by the face detector 12, from the frame of the video image imaged by imaging unit 11. The clipped facial image data is data which includes a rectangular image having a size as large as includes the imaged face. Face detector 12 and face clipping unit 13 are functions performed, for example, by processor 16 such as a central processing unit (CPU), a micro processing unit (MPU), or a digital signal processor (DSP). Processor 16 executes, for example, an application program stored in an internal memory so as to realize the function of face detector 12 and face clipping unit 13.

Communication unit 14 is connected to facial recognition server 30 in a wired or wireless manner, and transmits facial image data clipped by face clipping unit 13, to facial recognition server 30. For example, in a case where camera device 10 is a network camera, communication unit 14 is capable of transmitting facial image data via an internet protocol (IP) network.

Facial recognition server 30 performs recognition by collating a face included in facial image data received from each of camera devices 10 with the pre-registered face. Facial recognition server 30 includes communication unit 31, facial feature extractor 32, facial feature comparator 33, imaging time point comparator 34, preservation unit 35, pre-passing comparative original facial feature data memory 41, and facial image data memory 42.

Communication unit 31 receives facial image data from camera device 10 and transmits a searching result (that is, statistical data) which corresponds to a request (for example, searching request which will be described later) from user terminal 60 in accordance with the request, to user terminal 60.

Facial feature extractor 32 as an example of a feature extractor extracts features (simply referred to as "facial features" below) of a face, from facial image data received by communication unit 31. Facial feature extraction processing is processing of extracting, for example, features such as a position of the eyeball, a positional relationship between the eyes, the nose, and the mouse, and a direction in which wrinkles are formed, by using a well-known technology.

Facial feature comparator 33 compares facial features extracted by facial feature extractor 32 to facial features registered in pre-passing comparative original facial feature data memory 41, and determines whether or not similarity between the extracted facial features and the registered facial features is equal to or higher than a predetermined value. In a case where the similarity is not equal to or higher than the predetermined value (that is, in a case where the similarity is smaller than the predetermined value), facial feature comparator 33 determines the similarity to be low. A predetermined value (second threshold) when the similarity is determined to be low may be equal to a predetermined value (first threshold) when the similarity is determined to be high or may be lower than the first threshold.

Pre-passing comparative original facial feature data memory 41 as an example of a facial feature memory preserves facial features in a case where the facial features which have been extracted by facial feature extractor 32 from facial image data transmitted from camera device 10 satisfy a predetermined preservation condition. The facial features are preserved as features of facial image data including the face of a person who has passed through the imaging area, for a predetermined period. At this time, information of an imaging time point or the imaging area (position) are preserved as attached information, in addition to the features of the facial image data.

The predetermined period starts from an imaging time point when image data is obtained by imaging of camera device 10. The imaging time point is included in a header of the image data, for example. The predetermined period may be randomly set or changed in accordance with an operation of user terminal 60, so as to match with the environment of the imaging area. For example, in a case where the imaging area is in a store such as a restaurant, the predetermined period is set to be two hours as an example. In a case where the imaging area is in an office building, the predetermined period is set to be 6 to 7 hours as an example. The predetermined period may be previously set in facial recognition server 30, or may be set in a manner that a user such as a manager operates user terminal 60 so as to transmit the value for the predetermined period to facial recognition server 30.

Similar to the facial feature, facial image data memory 42 preserves facial image data of the facial features registered in pre-passing comparative original facial feature data memory 41, in association with the facial features, for the predetermined period. Here, if the predetermined period elapses and thus the facial features preserved in pre-passing comparative original facial feature data memory 41 are deleted, facial image data which has been preserved in facial image data memory 42 and corresponds to the facial features is also simultaneously deleted. However, the image data may be not deleted but preserved for the longer period (for example, one year). The image data may be not deleted and pieces of image data as many as some amount may be accumulated, and thus may be utilized as big data.

Imaging time point comparator 34 acquires an imaging time point of facial image data received from camera device 10 in a case where the similarity between the facial features extracted by facial feature extractor 32 and the facial features registered in pre-passing comparative original facial feature data memory 41 is equal to or higher than the predetermined value (first threshold). As described above, the imaging time point is described in header information of the facial image data.

Imaging time point comparator 34 determines whether or not the registered facial features are preserved in pre-passing comparative original facial feature data memory 41 from an imaging time point of facial image data having facial features extracted by facial feature extractor 32 until the predetermined time. When statistical processing which will be described later is performed, the predetermined time is a time which is set not to repetitively count (double-count) the same person. The predetermined time is set to be an adequate value in accordance with the environment of the imaging area. For example, in a case where the predetermined period when facial features are allowed to be preserved in pre-passing comparative original facial feature data memory 41 is 24 hours, the predetermined time is set to be, for example, two hours which are shorter than 24 hours. The predetermined period and the predetermined time may be the same period. In this case, facial features before a predetermined time are not provided in pre-passing comparative original facial feature data memory 41. Thus, imaging time point comparator 34 may be omitted.

Preservation unit 35 is connected to pre-passing comparative original facial feature data memory 41 and facial image data memory 42. Preservation unit 35 preserves features of facial image data in pre-passing comparative original facial feature data memory 41 and preserves facial image data corresponding to the features, in facial image data memory 42. As will be described later, even in a case where statistical processing is not performed on facial features, the facial features are preserved in a case where facial image data corresponding to the facial features satisfies the preservation condition.

Facial recognition server 30 further includes age-and-gender determiner 36, statistics unit 37, preservation unit 38, statistical data searching unit 39, and age-and-gender statistical data memory 43.

Age-and-gender determiner 36 estimates the age and the gender based on the facial features extracted by facial feature extractor 32, by using a well-known technology. The estimated age may be expressed by an age range of a certain degree or may be expressed by a representative value.

Statistics unit 37 as an example of the statistical processing unit performs statistical processing for the age and the gender as a target of statistics. In the statistical processing, for example, the number of faces included in a video image imaged by camera device 10 is counted for each age and each gender, and is registered as age-and-gender statistical data. The statistical processing may include processing of calculating a ratio of each age group occupying in the population, a ratio between men and women, and the like, simply in addition to processing of counting up the number of people (number of faces) for each age and each gender. In addition, in the statistical processing, counting is performed so as to allow searching in accordance with the AND condition or the OR condition of searching conditions (year/month/day, period, location, age, gender, camera ID, and the like) which will be described later, and the resultant obtained by the counting may be set as the age-and-gender statistical data. The age-and-gender statistical data is statistical data which is classified by at least the age and the gender, and may be sub-classified by other factors. Preservation unit 38 is connected to age-and-gender statistical data memory 43, and thus preserves the age-and-gender statistical data which has been subjected to statistical processing by statistics unit 37, in age-and-gender statistical data memory 43. Age-and-gender statistical data memory 43 preserves the age-and-gender statistical data for a long term and is used when statistical data is used.

Statistical data searching unit 39 searches for age-and-gender statistical data memory 43 in a predetermined searching condition, in accordance with a request from user terminal 60, and transmits a searching result to user terminal 60 as a response.

User terminal 60 is a general-purpose computer device that performs various settings or requests for facial recognition server 30. User terminal 60 includes communication unit 61, controller 62, display 63, and operation unit 64. Communication unit 61 is connected to facial recognition server 30 in a wired or wireless manner, and thus is capable of communicating with facial recognition server 30. For example, communication unit 61 is connected to facial recognition server 30 via an IP network.

Controller 62 collectively controls an operation of user terminal 60, executes an application, and requires facial recognition server 30 to perform searching processing in accordance with an input operation of a user. Display 63 displays various types of information and displays the searching condition, the searching result, and the like which will be described later, on a UI screen. Operation unit 64 is a keyboard, a mouse, or the like, and receives an input operation from a user, such as the searching condition.

In a case where user terminal 60 is configured by a portable tablet terminal, operation unit 64 is integrated with display 63 as a touch panel. Thus, an input operation may be directly performed on the screen of display 63.

An operation of facial recognition system 5 having the above-described configuration will be described.

Figure 2:
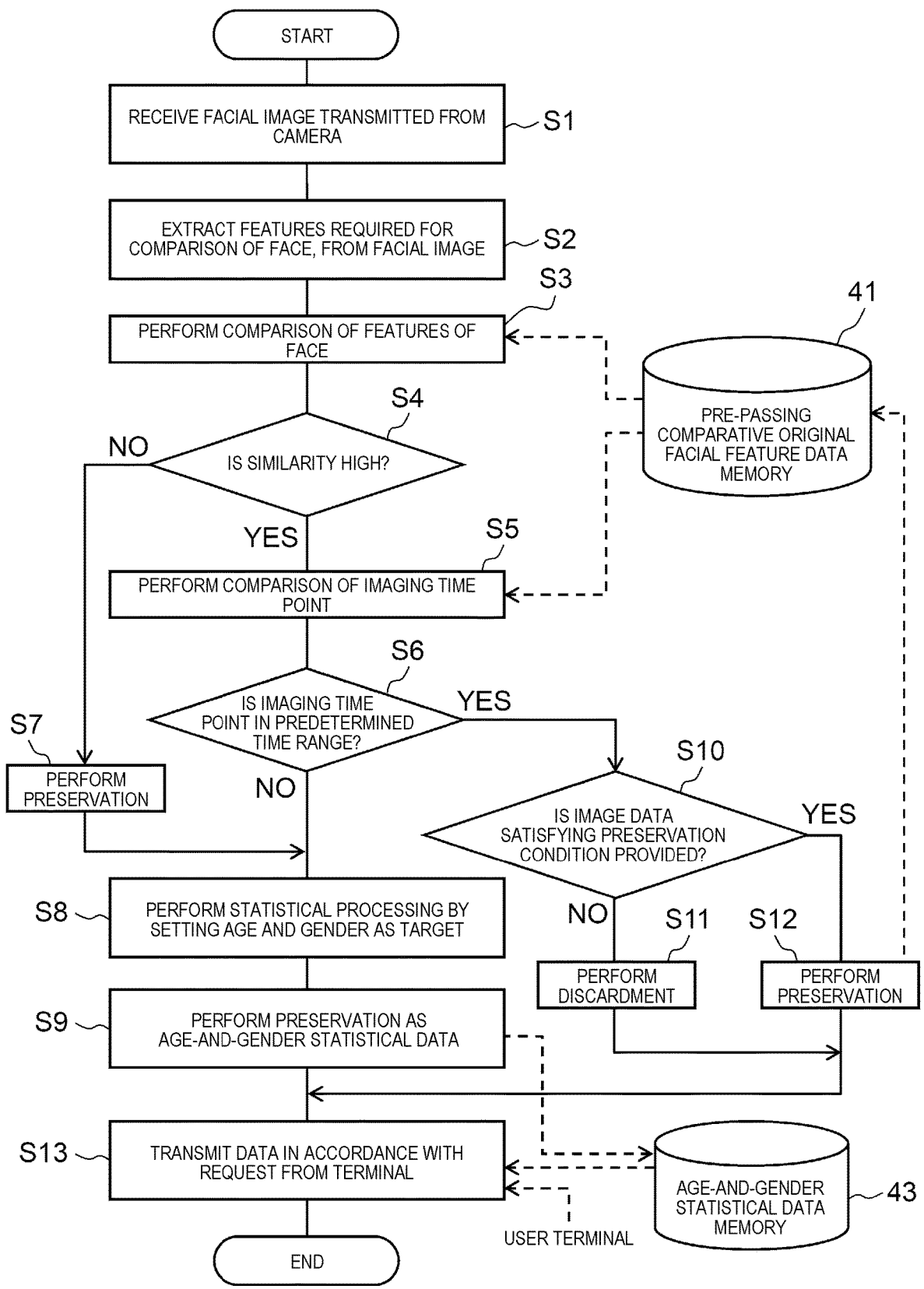
FIG. 2 is a flowchart illustrating an example of operation procedures of face detection processing in a facial recognition server in this exemplary embodiment.

FIG. 2 is a flowchart illustrating an example of operation procedures of face detection processing in facial recognition server 30 in this exemplary embodiment. Communication unit 31 in facial recognition server 30 receives facial image data transmitted from camera device 10 (S1).

Facial feature extractor 32 extracts facial features from the received facial image data (S2). Features such as a position of the eyeball, a positional relationship between the eyes, the nose, and the mouse, and a direction in which wrinkles are formed are extracted as the facial features. Facial feature comparator 33 compares the facial features extracted by facial feature extractor 32 to facial features registered in pre-passing comparative original facial feature data memory 41 (S3), and determines whether or not similarity between the extracted facial features and the registered facial features is equal to or higher than a predetermined value (first threshold) (S4).

In a case where the similarity is not equal to or higher than the predetermined value (that is, in a case where the similarity is determined to be low), preservation unit 35 preserves the facial features extracted by facial feature extractor 32, in pre-passing comparative original facial feature data memory 41 (S7). Age-and-gender determiner 36 estimates the age and the gender based on the facial features extracted by facial feature extractor 32, by using a well-known technology. Statistics unit 37 performs statistical processing for the age and the gender as a target of statistics (S8). In the statistical processing, the number of pieces of age-and-gender statistical data which are estimated from the extracted facial features and are classified for each age and each gender of a person is counted so as to increment (count up).

Preservation unit 38 preserves age-and-gender statistical data which has been subjected to statistical processing by statistics unit 37, in age-and-gender statistical data memory 43 (S9).

In a case where it is determined, in Step S4, that the similarity is equal to or higher than the predetermined value (first threshold), imaging time point comparator 34 compares an imaging time point of facial image data having facial features which have been extracted by facial feature extractor 32, to an imaging time point of facial features registered in pre-passing comparative original facial feature data memory 41 (S5). Imaging time point comparator 34 determines whether or not features which are preserved in pre-passing comparative original facial feature data memory 41 and has high similarity are preserved until a predetermined time (in a range of a predetermined time) from the imaging time point of the facial image data having the facial features which have been extracted by facial feature extractor 32 (S6).

In a case where the imaging time point thereof is out of the range of the predetermined time (NO in S6), the facial features are set as facial features of new facial image data. Statistics unit 37 performs the above-described statistical processing in Step S8. In a case where it is determined that the imaging time point thereof is in the range of the predetermined time in Step S6 (YES in S6), statistics unit 37 determines that the extracted facial features are already preserved. Thus, statistics unit 37 determines whether or not facial image data having the facial features satisfies the preservation condition (S10). In a case where the facial image data does not satisfy the preservation condition (NO in S10), facial recognition server 30 discards the facial features without being preserved in pre-passing comparative original facial feature data memory 41 (S11). In a case where the facial image data satisfies the preservation condition (YES in S10), preservation unit 35 preserves the facial features in pre-passing comparative original facial feature data memory 41 (S12).

Here, for example, in a case where preserving only the first image is set as the preservation condition, since the facial image data determined in Step S10 is not the first image, the facial features corresponding to the facial image data are not preserved and are discarded. In a case where a preservation condition in which an orientation of a face included in the facial image data is directed to the front and the face is largely shown is provided, if the facial image data does not satisfy the preservation condition, the facial feature corresponding to the facial image data are discarded. In a case where preserving all pieces of facial image data is set as the preservation condition, facial features are preserved regardless of image data. The preservation condition may be previously set in preservation unit 35 and may be changed by setting information from user terminal 60 in the middle of the operation.

In the processes of Steps S1 to S12, if the age-and-gender statistical data and the facial features are completely preserved, statistical data searching unit 39 receives a request from user terminal 60, searches for age-and-gender statistical data registered in age-and-gender statistical data memory 43, in accordance with the request, and transmits the corresponding age-and-gender statistical data to user terminal 60 as a response (S13). Then, facial recognition server 30 ends the main operation.

User terminal 60 requires facial recognition server 30 to search for age-and-gender statistical data and receives a searching result from facial recognition server 30. FIG. 3 is a diagram illustrating a UI (user interface) screen displayed in display 63 of user terminal 60. The searching condition used for searching for age-and-gender statistical data registered in age-and-gender statistical data memory 43 by a user is displayed on the left side of the screen in display 63.

Here, keywords such as year/month/day, a time zone (period), a location, the age, the gender, a camera ID when imaging is performed may be selected as the searching condition. A user inputs a check mark into an input box of each searching item, and thus searching items may be searched in the AND condition or the OR condition which is preset.

If user terminal 60 transmits the searching condition set by the user, to the facial recognition server 30, statistical data searching unit 39 searches for age-and-gender statistical data registered in age-and-gender statistical data memory 43, in accordance with the searching condition. Facial recognition server 30 extracts facial features of a person, which satisfy the searching condition, from age-and-gender statistical data memory 43. Facial recognition server 30 extracts facial image data which is registered in facial image data memory 42 and is associated with the facial features, from facial image data memory 42. Facial recognition server 30 transmits the facial features and the facial image data which have been extracted, to user terminal 60.

As a result, the facial features and the facial image data of a person which satisfy the searching condition are displayed on the right side of the screen in display 63 of user terminal 60. Here, as the searching result, facial features TK1, TK2, and TK3, and pieces of facial image data G1, G2, and G3 of three persons are displayed.

As described above, in facial recognition system 5 in this exemplary embodiment, facial feature extractor 32 in facial recognition server 30 extracts facial features of facial image data including a face which is shown in a video image obtained by camera device 10 imaging the imaging area. Preservation unit 35 preserves facial features of facial image data including a face which has passed through the imaging area, in pre-passing comparative original facial feature data memory 41. In a case where facial features which has high similarity (equal to or higher than the predetermined value)

to the facial features (extracted by facial feature extractor 32) of the facial image data imaged by camera device 10 are not preserved in pre-passing comparative original facial feature data memory 41 until the predetermined time from an imaging time point by camera device 10, statistics unit 37 performs the statistical processing on the facial features of the facial image data, which have been extracted by facial feature extractor 32.

Thus, facial recognition server 30 determines that the facial features which are preserved at a time point close to the imaging time point and has high similarity are facial features of the same person. Since the facial features obtained at this imaging time point are not subjected to the statistical processing, it is possible to efficiently perform statistical processing without performing complicated determination, so as not to repetitively include the same person. In facial recognition system 5, since facial image data clipped from a video image frame in camera device 10 is transmitted to facial recognition server 30, it is possible to reduce the volume of transmitted data, in comparison to a case where video image data is transmitted.

In a case where the facial features having high similarity are preserved in pre-passing comparative original facial feature data memory 41 until the predetermined time, if facial image data imaged by camera device 10 does not satisfy the predetermined preservation condition, preservation unit 35 discards the facial features of the facial image data, which have been extracted by facial feature extractor 32. Thus, it is possible to omit the unnecessary facial features and reduce the data volume to be preserved.

If the facial image data imaged by camera device 10 satisfies the predetermined preservation condition, the facial features of the facial image data, which have been extracted by facial feature extractor 32 are preserved in pre-passing comparative original facial feature data memory 41. Thus, the volume of data of effective facial features is increased and determination accuracy for the similarity of the facial features is improved.

In a case where facial features which have low similarity (which does not reach the predetermined value (second threshold)) to the facial features (extracted by facial feature extractor 32) of the facial image data imaged by camera device 10 are preserved in pre-passing comparative original facial feature data memory 41, statistics unit 37 performs the statistical processing on the facial features of the facial image data, which have been extracted by facial feature extractor 32. Thus, it is possible to perform the statistical processing without losing the face of the first person.

The predetermined time may be set in accordance with the environment of the imaging area in a restaurant, a building, or the like. Thus, it is possible to perform the statistical processing so as not to repetitively include the same person, regardless of the environment of the imaging area.

Facial recognition server 30 searches for age-and-gender statistical data (features of facial image data, which are subjected to the statistical processing) registered in age-and-gender statistical data memory 43, in accordance with a request from user terminal (terminal device) 60, and transmits a searching result to user terminal 60 as a response. Thus, it is possible to contribute to using of a user and various types of utilization are expected.

Modification Example of this Exemplary Embodiment

Figure 4:
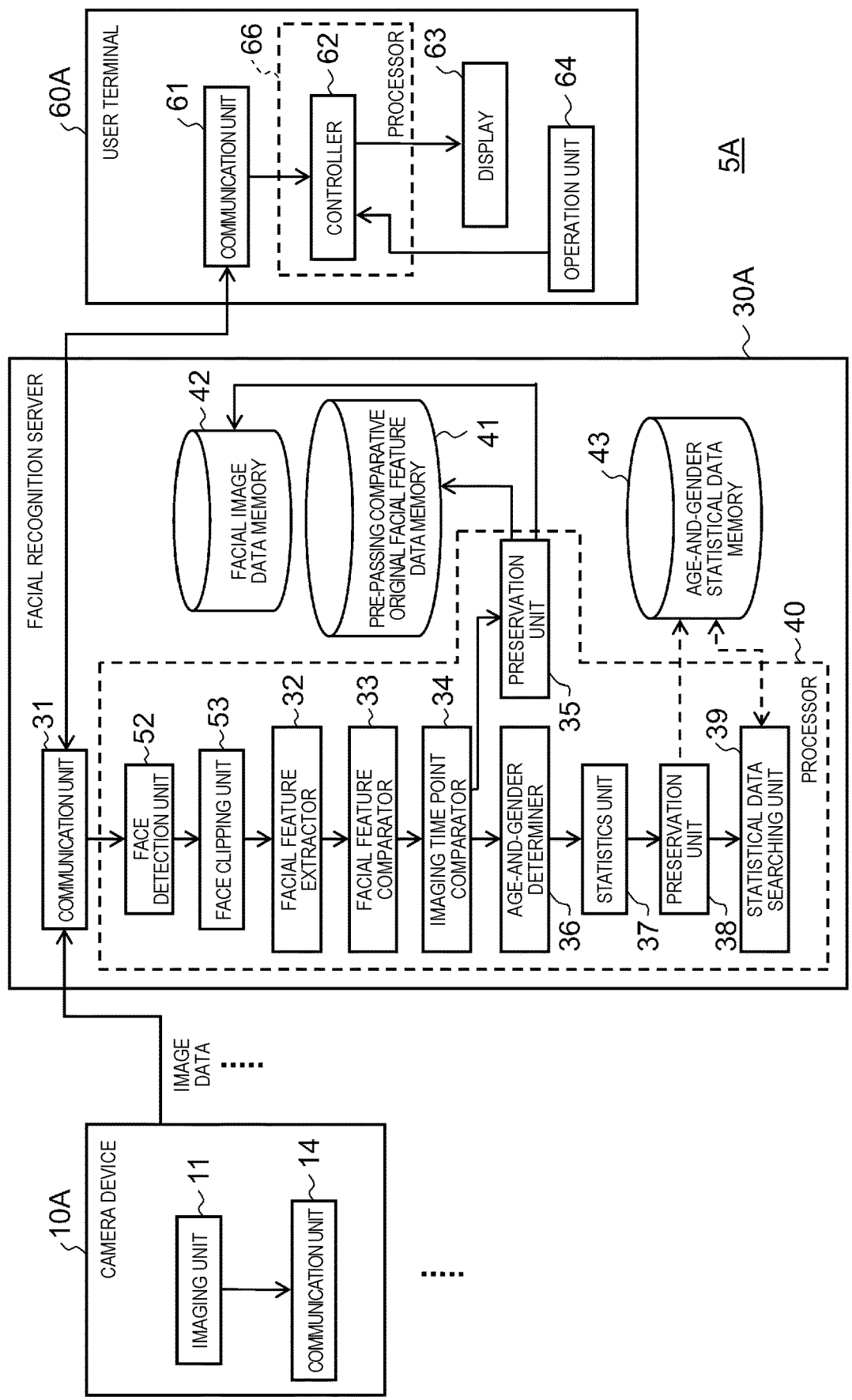
FIG. 4 is a block diagram specifically illustrating an example of an internal configuration of facial recognition system in a modification example of this exemplary embodiment.

FIG. 4 is a block diagram specifically illustrating an example of an internal configuration of facial recognition system 5A in a modification example of this exemplary embodiment. Constituent components which are the same as those in this exemplary embodiment are denoted by the same reference marks and descriptions thereof will not be repeated. Facial recognition system 5A in the modification example in this exemplary embodiment is different from the above-described exemplary embodiment in that camera device 10A includes only imaging unit 11 and communication unit 14, and only transmits image data itself imaged by imaging unit 11, to facial recognition server 30A by communication unit 14.

Facial recognition server 30A includes face detector 52 and face clipping unit 53 in processor 40, differently from that in this exemplary embodiment. Face detector 52 detects a face included in an image regarding image data (image) transmitted from camera device 10A, similar to face detector 12 in this exemplary embodiment. Face clipping unit 53 clips facial image data including a face which has been detected by face detector 52, from a frame of a video image, similar to face clipping unit 13 in this exemplary embodiment.

As described above, in facial recognition system 5A in the modification example in this exemplary embodiment, processing of applying a load to facial recognition server 30A is efficiently concentrated. Thus, it is possible to reduce the load of camera device 10A. As described above, since camera device 10A only transmits the captured image data (video image) to facial recognition server 30, camera device 10A is made with the simple configuration. In addition, camera device 10A may be used even if camera device 10A is already provided in the imaging area. In facial recognition system 5A in the modification example in this exemplary embodiment, a general-purpose network camera may be also used as camera device 10A.

Hitherto, various exemplary embodiments are described with reference to the drawings, but the disclosure is not limited to the above-described examples. It is apparent that the person in the related art may suppose various changes or modifications in the range described in claims and it is understood that those belong to the technical scope of the disclosure.

INDUSTRIAL APPLICABILITY

The disclosure is useful because it is possible to efficiently perform statistical processing without performing complicated determination, so as not to repetitively include the same person when an image imaged by a camera device is used.

REFERENCE MARKS IN THE DRAWINGS 5, 5A FACIAL RECOGNITION SYSTEM
10, 10A CAMERA DEVICE
11 IMAGING UNIT
12, 52 FACE DETECTOR
13, 53 FACE CLIPPING UNIT
14 COMMUNICATION UNIT
16, 40, 66 PROCESSOR
30, 30A FACIAL RECOGNITION SERVER
31 COMMUNICATION UNIT
32 FACIAL FEATURE EXTRACTOR
33 FACIAL FEATURE COMPARATOR
34 IMAGING TIME POINT COMPARATOR
35, 38 PRESERVATION UNIT
36 AGE-AND-GENDER DETERMINER
37 STATISTICS UNIT

39 STATISTICAL DATA SEARCHING UNIT
41 PRE-PASSING COMPARATIVE ORIGINAL FACIAL FEATURE DATA MEMORY
42 FACIAL IMAGE DATA MEMORY
43 AGE-AND-GENDER STATISTICAL DATA MEMORY
60 USER TERMINAL
61 COMMUNICATION UNIT
62 CONTROLLER
63 DISPLAY
64 OPERATION UNIT
TK1, TK2, TK3 FACIAL FEATURE
G1, G2, G3 FACIAL IMAGE DATA

The invention claimed is:

1. A facial recognition system comprising:
a camera device which in operation produces video image data by imaging an imaging area; and
a facial recognition server, which is connected to the camera device,
the facial recognition server comprising:
   a feature extractor, which in operation, extracts features of facial image data including a face of a person shown in the video image data,
   a preservation unit, which in operation, preserves the features of the facial image data extracted by the feature extractor in a facial feature memory, and
   a statistical processing unit, which in operation:
      performs statistical processing by using the features of the facial image data extracted by the feature extractor, in a case where: the features of facial image data extracted by the feature extractor have a similarity that is equal to or greater than a predetermined value to features of facial image data that are present in the facial feature memory, and a predetermined time has elapsed from an imaging time point by the camera device of the video image data that includes the facial image data,
wherein the facial recognition server discards the features of the facial image data extracted by the feature extractor, in a case where: the features of facial image data extracted by the feature extractor have a similarity that is equal to or greater than a predetermined value to features of facial image data that are present in the facial feature memory, the predetermined time has not elapsed from an imaging time point by the camera device of the video image data that includes the facial image data, and without satisfying one of preservation conditions: the facial image data is from the first captured facial image of the person, and an orientation of a face included in the facial image data is largely shown front face.

2. The facial recognition system of claim 1,
wherein the facial recognition server, in operation, preserves the features of the facial image data extracted by the feature extractor, in the facial feature memory, in a case where the facial image data corresponding to the video image data satisfies a predetermined preservation condition.

3. The facial recognition system of claim 1,
wherein the facial recognition server, in operation, performs the statistical processing by using the features of the facial image data extracted by the feature extractor, in a case where the features of the facial image data extracted by the feature extractor similarity are not similar to features of facial image data preserved in the facial feature memory.

4. The facial recognition system of claim 1,
wherein the predetermined time is randomly set in accordance with an environment around the imaging area.

5. The facial recognition system of claim 1,
wherein the facial recognition server, in operation, searches for the features of the facial image data that are subjected to the statistical processing by the statistical processing unit, in accordance with a searching request from a terminal device, and transmits a searching result which corresponds to the searching request, to the terminal device.

6. A facial recognition server which is connected to a camera device, the server comprising:
a feature extractor, which in operation, extracts features of facial image data including a face of a person shown in video image data, based on the video image data from the camera device;
a preservation unit, which in operation, preserves the features of the facial image data extracted by the feature extractor, in a facial feature memory; and
a statistical processing unit, which in operation:
   performs statistical processing by using the features of the facial image data extracted by the feature extractor, in a case where: the features of facial image data extracted by the feature extractor have a similarity that is equal to or greater than a predetermined value to features of facial image data that are present in the facial feature memory, and a predetermined time has elapsed from an imaging time point by the camera device of the video image data that includes the facial image data,
wherein the facial recognition server discards the features of the facial image data extracted by the feature extractor, in a case where: the features of facial image data extracted by the feature extractor have a similarity that is equal to or greater than a predetermined value to features of facial image data that are present in the facial feature memory, the predetermined time has not elapsed from an imaging time point by the camera device of the video image data that includes the facial image data, and without satisfying one of preservation conditions: the facial image data is from the first captured facial image of the person, and an orientation of a face included in the facial image data is largely shown front face.

7. A facial recognition method in a facial recognition system in which a camera device and a facial recognition server are connected to each other, the method comprising executing at least in part using a processor, at least the following processing:
processing of extracting features of facial image data including the face of a person shown in video image data, based on the video image data obtained by the camera device imaging an imaging area;
preserving the extracted features of the facial image data in a facial feature memory;
performing statistical processing by using the extracted features of the facial image data in a case where: the extracted features of facial image data have a similarity that is equal to or greater than a predetermined value to features of stored facial image data that are present in the facial feature memory, and a predetermined time has elapsed from an imaging time point of the video image data that includes the facial image data; and
discarding the extracted features of the facial image data in a case where: the extracted features of facial image data have a similarity that is equal to or greater than a predetermined value to stored features of facial image data that are present in the facial feature memory, the predetermined time has not elapsed from an imaging time point of the video image data that includes the facial image data, and without satisfying one of preservation conditions: the facial image data is from the first captured facial image of the person, and an orientation of a face included in the facial image data is largely shown front face.

* * * * *